(12) United States Patent
Venterosa

(10) Patent No.: US 11,772,607 B1
(45) Date of Patent: Oct. 3, 2023

(54) ACCESSORY FOR A WINDSHIELD WIPER

(71) Applicant: Donald Venterosa, Norwood, MA (US)

(72) Inventor: Donald Venterosa, Norwood, MA (US)

( * ) Notice: Subject to any disclaimer, the term of this patent is extended or adjusted under 35 U.S.C. 154(b) by 268 days.

(21) Appl. No.: 17/341,444

(22) Filed: Jun. 8, 2021

(51) Int. Cl.
*B60S 1/08* (2006.01)
*B60S 1/18* (2006.01)
*B60S 1/04* (2006.01)

(52) U.S. Cl.
CPC ............... *B60S 1/08* (2013.01); *B60S 1/0452* (2013.01); *B60S 1/18* (2013.01)

(58) Field of Classification Search
CPC ........ F16H 1/16; B60S 1/0455; B60S 1/3463; B60S 1/26; B60S 1/3413; B60S 1/08; B60S 1/0452; B60S 1/18
USPC ..................................... 15/250.203, 250.001
See application file for complete search history.

(56) References Cited

U.S. PATENT DOCUMENTS

| D387,028 S | 12/1997 | Ireland |
| 7,345,445 B2 | 3/2008 | Huntzicker |
| 7,528,500 B2 | 5/2009 | Kwon |
| 7,703,169 B2 * | 4/2010 | Cakmak ................ B60S 1/0486 |
| | | 15/250.19 |
| 9,937,897 B1 * | 4/2018 | Ortiz ..................... B60S 1/3413 |
| 2007/0056947 A1 | 3/2007 | Damian |
| 2015/0014294 A1 | 1/2015 | Dubosc |
| 2016/0031419 A1 | 2/2016 | Nelson |

FOREIGN PATENT DOCUMENTS

WO 2013124384 8/2013

* cited by examiner

*Primary Examiner* — Katina N. Henson
(74) *Attorney, Agent, or Firm* — Kyle A. Fletcher, Esq.

(57) ABSTRACT

The accessory for a windshield wiper is for use with a vehicle. The vehicle further includes a windshield and windshield wiper. The windshield wiper further includes a claw and one or more blades. The accessory for a windshield wiper attaches to the windshield wiper. The accessory for a windshield wiper comprises a lifting structure and a control apparatus. The control apparatus controls the operation of the lifting structure. The lifting structure is a mechanical device that physically raises or lowers the windshield wiper above the windshield or onto the windshield. The control apparatus controls the operation of the lifting structure.

15 Claims, 3 Drawing Sheets

ACCESSORY FOR A WINDSHIELD WIPER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles, more specifically, an accessory configured for use in cleaning a windshield. (B60S1/026)

SUMMARY OF INVENTION

The accessory for a windshield wiper is configured for use with a vehicle. The vehicle further comprises a windshield and windshield wiper. The windshield wiper further comprises a claw and one or more blades. The accessory for a windshield wiper attaches to the windshield wiper. The accessory for a windshield wiper is an automatic device. By automatic is meant that the accessory for a windshield wiper can operate without local human supervision. The accessory for a windshield wiper is remotely controlled. By remotely controlled is meant that the accessory for a windshield wiper initiate operation without local intervention. The accessory for a windshield wiper comprises a lifting structure and a control apparatus. The control apparatus controls the operation of the lifting structure. The lifting structure is a mechanical device that physically raises and lowers the windshield wiper above the windshield. The lowering of the lifting structure involves a reverse operation. The control apparatus: a) receives instructions remotely; b) provides the energy necessary to generate the motive forces required to operate the lifting structure; and, c) controls the operation of the lifting structure.

These together with additional objects, features and advantages of the accessory for a windshield wiper will be readily apparent to those of ordinary skill in the art upon reading the following detailed description of the presently preferred, but nonetheless illustrative, embodiments when taken in conjunction with the accompanying drawings.

In this respect, before explaining the current embodiments of the accessory for a windshield wiper in detail, it is to be understood that the accessory for a windshield wiper is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the accessory for a windshield wiper.

It is therefore important that the claims be regarded as including such equivalent construction insofar as they do not depart from the spirit and scope of the accessory for a windshield wiper. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
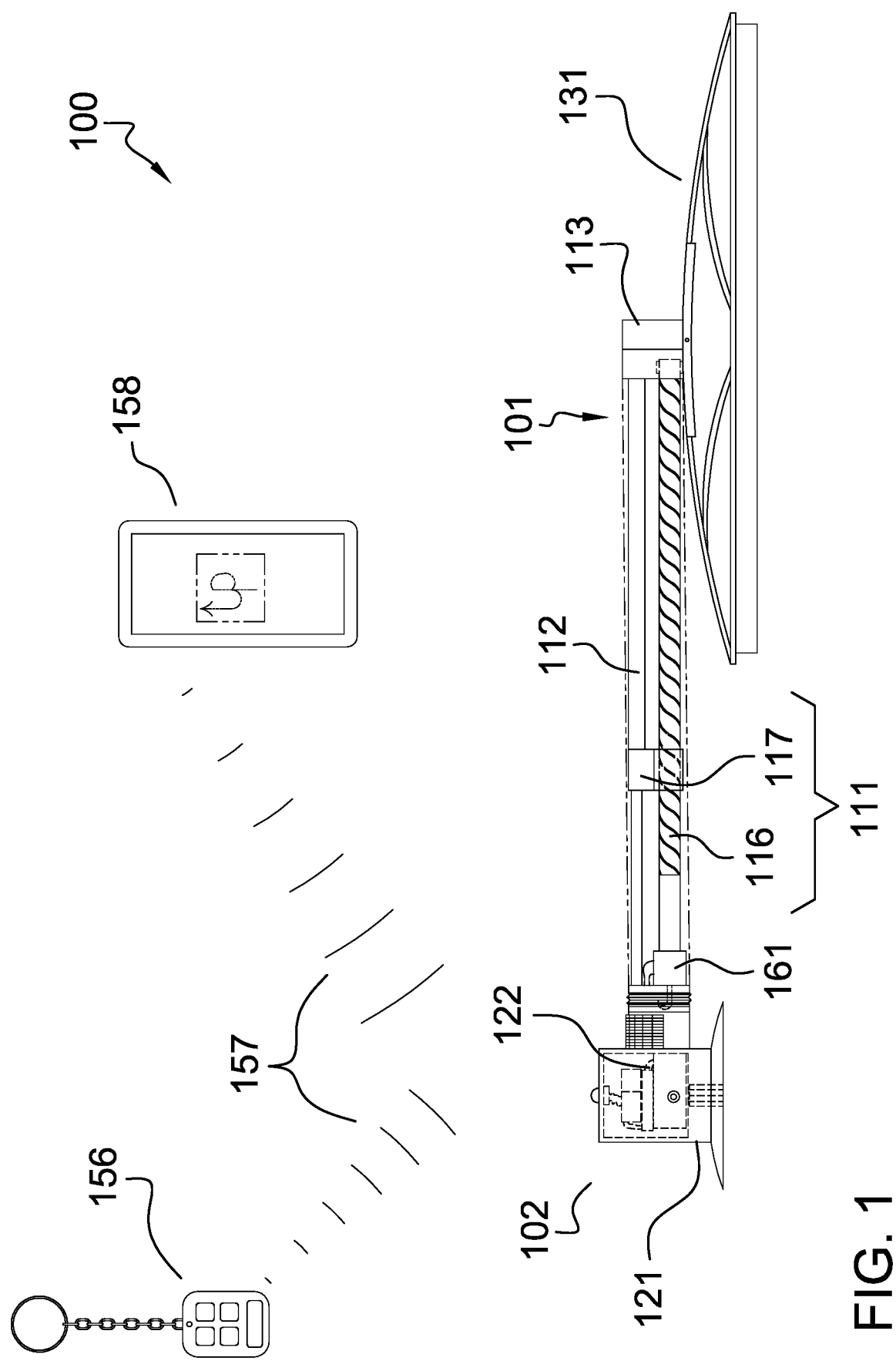
FIG. 1 is a front view of an embodiment of the disclosure.
Figure 2:
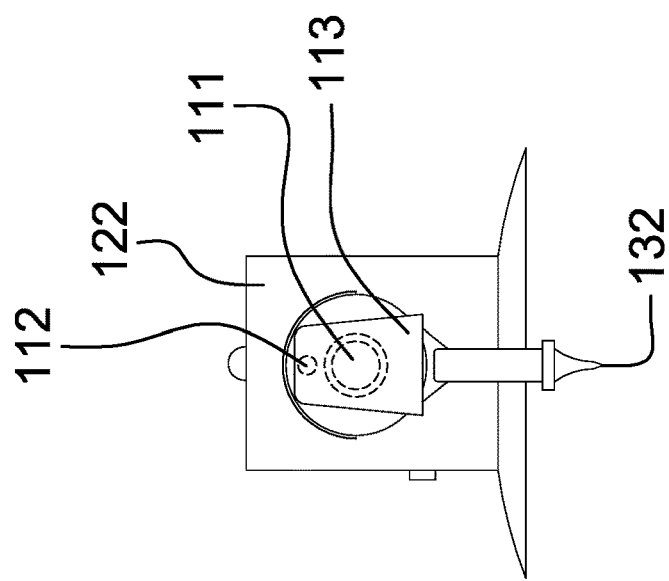
FIG. 2 is a side view of an embodiment of the disclosure.
Figure 3:
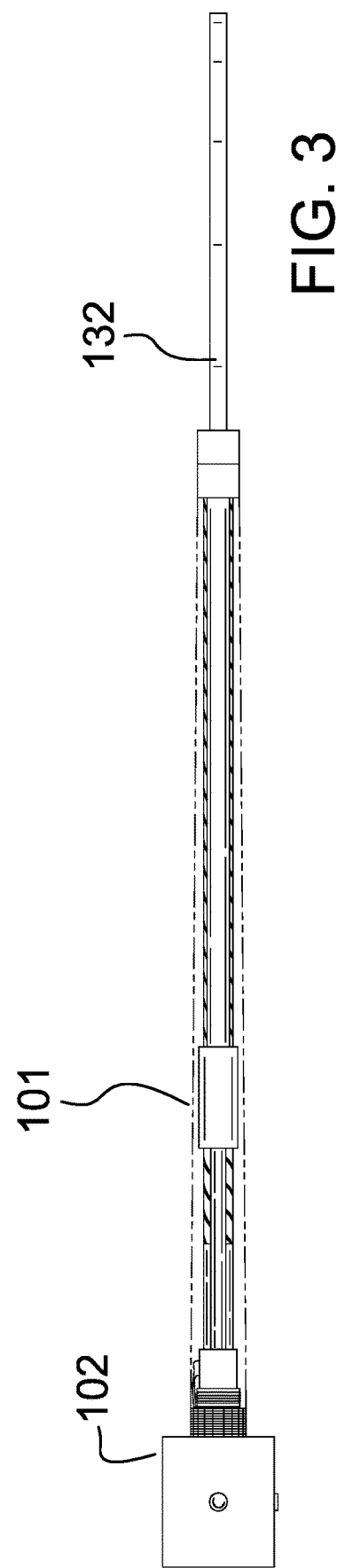
FIG. 3 is a top view of an embodiment of the disclosure.
Figure 4:
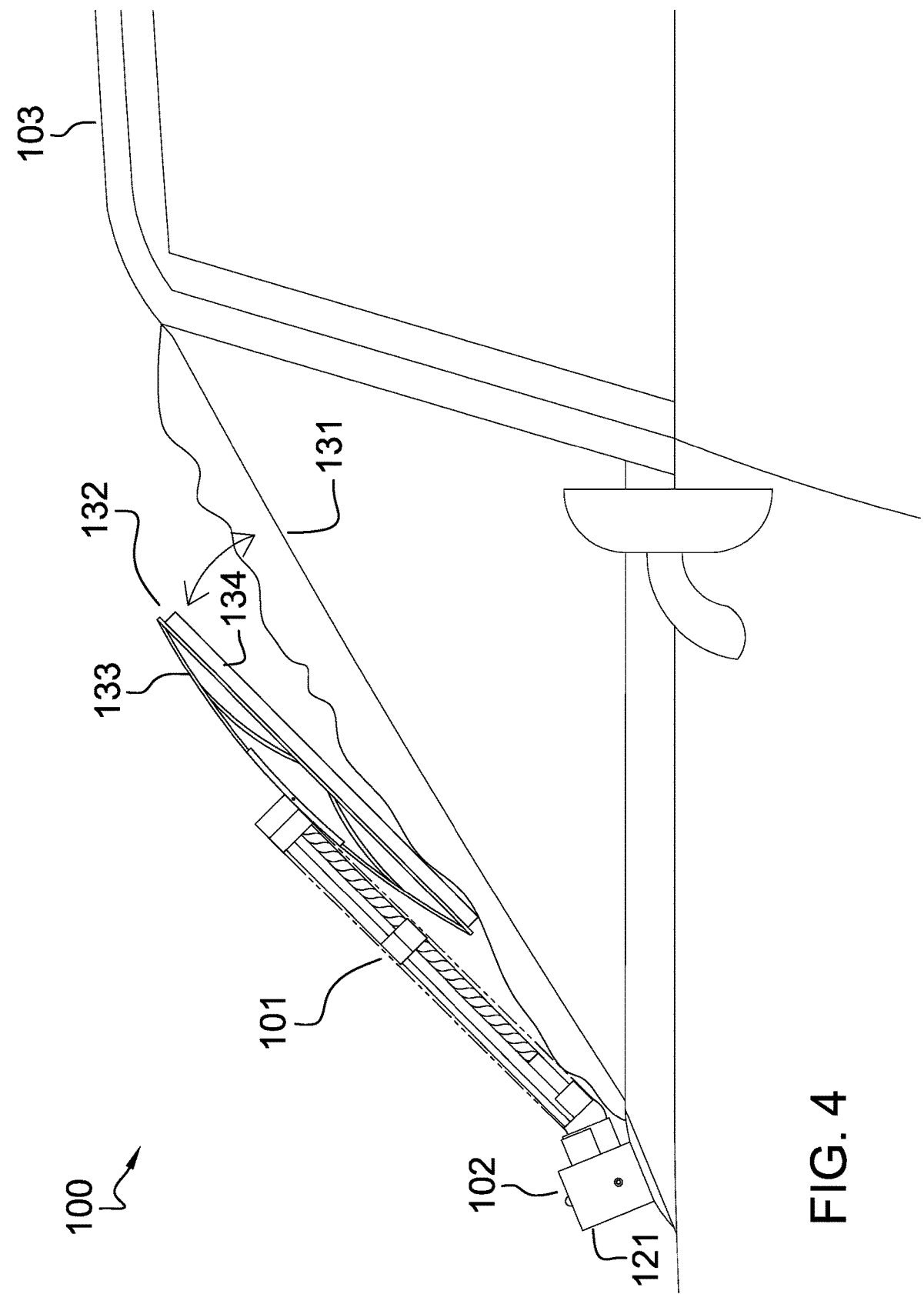
FIG. 4 is an in-use view of an embodiment of the disclosure.

Detailed reference will now be made to one or more potential embodiments of the disclosure, which are illustrated in FIGS. 1 through 4.

The accessory for a windshield wiper 100 (hereinafter invention) is used with a vehicle 103. The vehicle 103 further comprises a windshield 131 and windshield 131 wiper 132. The windshield 131 wiper 132 further comprises a claw and one or more blades. The invention 100 attaches to the windshield 131 wiper 132. The invention 100 is an automatic device. By automatic is meant that the invention 100 can operate without local human supervision. The invention 100 is remotely controlled. By remotely controlled is meant that the invention 100 initiates operation without local intervention. The vehicle 103 is defined elsewhere in this disclosure.

The invention 100 comprises a lifting structure 101 and a control apparatus 102. The control apparatus 102 controls the operation of the lifting structure 101. The lifting structure 101 is a mechanical device that physically raises and lowers the windshield 131 wiper 132 above the windshield 131. The control apparatus 102: a) receives instructions remotely; b) provides the energy necessary to generate the motive forces required to operate the lifting structure 101; and, c) controls the operation of the lifting structure 101.

The windshield 131 wiper 132 is a safety device that, by law, is provisioned with a vehicle 103. By vehicle 103 is meant a motorized device, such as an automobile, that is intended to carry cargo and passengers over a road network.

The windshield 131 wiper 132 is a device that removes fluids and debris from the windshield 131 of the vehicle 103. The windshield 131 wiper 132 attaches to a motorized apparatus that rotates the windshield 131 wiper 132 along the surface of windshield 131 of the vehicle 103.

The windshield 131 wiper 132 comprises an adapter, a claw, a flexor 133, and one or more wiper blades 134. The adaptor is a mechanical device that attaches the windshield 131 wiper 132 to the motorized apparatus. The use of an adaptor allows for the windshield 131 wiper 132 to be quickly adapted for use with a variety of makes and models of vehicle 103. The claw is a rigid mechanical structure that attaches the flexor 133 to the adaptor. The flexor 133 is a semi-rigid structure with an elastic nature. The flexor 133 attaches the one or more wiper blades 134 to the claw. Each of the one or more wiper blades 134 is an elastomeric structure that slides along the surface of the windshield 131 to physically remove liquid and debris from the windshield 131. The flexor 133 has a spring-like structure that presses against the one or more wiper blades 134 such that the entire length of each wiper blade is firmly in contact with the surface of the windshield 131 as the wiper blade slides along the windshield 131. The design, manufacture, and use of a windshield 131 wiper 132 and the associated mechanical apparatus is well-known and documented in the automotive arts.

The windshield 131 is defined elsewhere in this disclosure. The windshield 131 wiper 132 is defined elsewhere in this disclosure.

The lifting structure 101 is a mechanical structure. The lifting structure 101 mechanically raises and lowers the windshield 131 wiper 132 above the windshield 131 of the vehicle 103. The lifting structure 101 comprises a worm drive 111, a bracing shaft 112, and a free end brace 113.

The worm drive 111 is a mechanical structure. The worm drive 111 is a rotating structure. The worm drive 111 raises the windshield 131 wiper 132 above the windshield 131. The worm drive 111 attaches to the control apparatus 102 in the manner of a cantilever. The worm drive 111 attaches to the control apparatus 102 such that the control apparatus 102 drives the operation of the worm drive 111. The worm drive 111 comprises a drive bolt 116 and a drive nut 117.

A first electric motor 161 drives the rotation of the drive bolt 116. The first electric motor 161 converts electrical power drawn from the vehicle 103 into rotational energy that is used to power the worm drive 111. The first electric motor 161 rotates the drive bolt 116.

The drive bolt 116 is a prism-shaped bolt that is further formed with an exterior screw thread. A congruent end of the drive bolt 116 attaches to the first electric motor 161 such that the rotation of the first electric motor 161 rotates the drive bolt 116. The axis of rotation of the electric motor 161 aligns with the center axis of the prism structure of the drive bolt 116. The drive bolt 116 attaches to the first electric motor 161 in the manner of a cantilever.

The rotation of the first electric motor 161 rotates the drive bolt 116 such that the drive nut 117 will move along the drive bolt 116 along the direction of the center axis of the drive bolt 116. The drive nut 117 is a device that screws onto the drive bolt 116 to form a threaded connection.

The rotation of the drive nut 117 moves the drive nut 117 in a direction parallel to the center axis of the drive bolt 116. The windshield 131 wiper 132 attaches to the drive nut 117 such that the motion of the drive nut 117 along the drive bolt 116 raises or lowers the windshield 131 wiper 132 above or back onto the windshield. It shall be noted that the reverse rotation of the drive bolt 116 will lower the windshield 131 wiper 132.

The bracing shaft 112 is a prism structure. The bracing shaft 112 is a rigid structure. The bracing shaft 112 attaches to the control apparatus 102 such that the bracing shaft 112 projects away from the control apparatus 102 in the manner of a cantilever. The bracing shaft 112 attaches to the control apparatus 102 such that the center axis of the prism structure of the bracing shaft 112 is parallel to the center axis of the prism structure of the drive bolt 116 of the worm drive 111. The bracing shaft 112 forms a brace that stabilizes the drive bolt 116 during the operation of the worm drive 111.

The free end brace 113 is a mechanical structure. The free end brace 113 attaches to the free end of the cantilever structure formed by the drive bolt 116 of the worm drive 111. The free end brace 113 simultaneously attaches to the free end of the cantilever structure formed by the bracing shaft 112. The free end brace 113 maintains the free end of the cantilever structure of the bracing shaft 112 in a fixed position relative to the free end of the cantilever structure of the drive bolt 116.

The control apparatus 102 provides the rotational energy required to operate the lifting structure 101. The control apparatus 102 controls the operation of the lifting structure 101. The control apparatus 102 attaches the windshield 131 wiper 132 to the vehicle 103. The control apparatus 102 is an electromechanical structure. The control apparatus 102 receives instructions remotely over a wireless communication link 157. The control apparatus 102 provides the energy necessary to generate the motive forces required to operate the lifting structure 101. The control apparatus 102 controls the operation of the lifting structure 101. The control apparatus 102 comprises a control housing 121 and a control circuit 122.

The control housing 121 is a hollow structure. The control housing 121 is a prism-shaped structure. The control housing 121 is a rigid structure. The control housing 121 contains the control circuit 122. The control housing 121 is formed with all apertures and form factors necessary to allow the control housing 121 to accommodate the use and operation of the control circuit 122. Methods to form a control housing 121 suitable for the purposes described in this disclosure are well-known and documented in the mechanical arts.

The control circuit 122 is an electric circuit. The control circuit 122 receives instructions remotely over a wireless communication link 157. The control circuit 122 provides the energy necessary to generate the motive forces required to operate the lifting structure 101. The control circuit 122 controls the operation of the lifting structure 101. The control circuit 122 is an independently powered electric circuit. By independently powered is meant that the control circuit 122 can operate without an electrical connection to an external power source 174.

The control circuit 122 further comprises the first electric motor 161, a remote control device 156 and a wireless communication link 157.

The control circuit 122 is a programmable electronic device that is used to manage, regulate, and operate the control circuit 122. The control circuit 122 is a wireless electronic communication device that communicates with a locally presented device remote control device 156. Specifically, the control circuit 122 establishes a wireless communication link 157 between the control circuit 122 and the remote control device 156. In the first potential embodiment of the disclosure, the control circuit 122 supports a communication protocol selected from the group consisting of a WiFi™ protocol or a Bluetooth™ protocol.

The first electric motor 161 is an electric motor. The control circuit 122 controls the operation of the first electric motor 161. The first electric motor 161 mechanically attaches to the worm drive 111 such that the first electric motor 161 drives the worm drive 111. The first electric motor 161 converts electrical energy into rotational energy. The rotational energy generated by each of the first electric motor 161 powers the operation of the worm drive 111 of the lifting structure 101.

The remote control device 156 is an electric circuit. The remote control device 156 forms the wireless communication link 157 with the control circuit 122 such that the remote control device 156 can send operating instructions to the control circuit 122. In a second potential embodiment of the disclosure, the remote control device 156 is a personal data device 158.

The personal data device 158 is a programmable electrical device that provides data management and communication services through one or more functions referred to as an application. The application is a set of logical operating instructions that are performed by the personal data device 158. The addition of an application will provide increased functionality for the personal data device 158. This disclosure assumes that an application exists for the purpose of interacting with the invention 100. Methods to design and implement an application on a personal data device 158 are well known and documented in the electrical arts.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Automatic: As used in this disclosure, automatic refers to a device, a process, or a system that operates without human control, supervision, or participation in the operation of the device, process, or system. The verb form of automatic is to automate.

Battery: As used in this disclosure, a battery is a chemical device consisting of one or more cells, in which chemical energy is converted into electricity and used as a source of power. Batteries are commonly defined with a positive terminal and a negative terminal.

Blade: As used in this disclosure, a blade is a term that is used to describe: 1) a wide and flat portion of a structure; or, 2) the cutting edge of a tool.

Bluetooth™: As used in this disclosure, Bluetooth™ is a standardized communication protocol that is used to wirelessly interconnect electronic devices.

Bolt: As used in this disclosure, a bolt is a cylindrical shaft that is formed with an exterior screw thread. A bolt is defined with an outer diameter.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism, or pyramidal structures share the same line they are said to be aligned. When the center axes of two cylinder, prism, or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar. Use Prism, pyramid, geometrically similar, truncated, align Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

External Power Source: As used in this disclosure, an external power source is a source of the energy that is externally provided to enable the operation of the present disclosure. Examples of external power sources include, but are not limited to, electrical power sources and compressed air sources.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Housing: As used in this disclosure, a housing is a rigid structure that encloses and protects one or more devices.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with a cylindrical negative space that further comprises an interior screw thread such that a second object with a matching exterior screw thread can be screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

PDD: As used in this disclosure, PDD is an acronym for personal data device.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones. See logical device Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Remote Control: As used in this disclosure, remote control means the establishment of control of a device from a distance. Remote control is generally accomplished through the use of an electrical device that generates electrically based control signals that are transmitted via radio frequencies or other means to the device.

Rigid Structure: As used in this disclosure, a rigid structure is a solid structure formed from an inelastic material that resists changes in shape. A rigid structure will permanently deform as it fails under a force.

Rotation: As used in this disclosure, rotation refers to the cyclic movement of an object around a fixed point or fixed axis. The verb of rotation is to rotate.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain.

Shaft: As used in this disclosure, a shaft is a long, narrow and rigid prism structure that is used as: 1) a structural element of a larger object; or 2) as a grip or lever for a handle. Shafts often have a cylindrical shape.

Tension Spring: As used in this disclosure, a tension spring, also commonly referred to as an extension spring and a helical coil spring, is a wire coil that resists forces attempting to pull the wire coil in the direction of the center axis of the wire coil. The tension spring will return to its original position when the pulling force is removed.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tool: As used in this disclosure, a tool is a device, an apparatus, or an instrument that is used to carry out an activity, operation, or procedure.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

WiFi™: As used in this disclosure, WiFi™ refers to the physical implementation of a collection of wireless electronic communication standards commonly referred to as IEEE 802.11x.

Windshield: As used in this disclosure, a windshield refers to the front and rear window of a vehicle that is intended to shield the occupants of the vehicle from the wind generated by the normal motion of the vehicle. Windscreen is a synonym for windshield.

Wipe: As used in this disclosure, the verb wipe refers to rubbing a surface with an object. When a sheeting is used as the object wiping the surface, the sheeting is often referred to as a "wipe."

Wiper Blade: As used in this disclosure, a wiper blade means a windshield wiper blade.

Wireless: As used in this disclosure, wireless is an adjective that is used to describe a communication channel between two devices that does not require the use of physical cabling.

Working Element: As used in this disclosure, the working element of a tool is the physical element on the tool that performs the actual activity, operation, or procedure the tool is designed to perform. For example, the cutting edge of a blade is the working element of a knife. See tool Worm Drive: As used in this disclosure, a worm drive refers to a mechanical arrangement where a rotating cylinder further comprising an exterior screw thread is used to: 1) rotate a gear; or 2) move a nut formed with an interior screw thread in a linear fashion in the direction of the center axis of the rotating cylinder. Worm drives are also referred to as worm gears.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. An accessory for a windshield wiper comprising a lifting structure and a control apparatus;
   wherein the control apparatus controls an operation of the lifting structure;
   wherein the lifting structure comprises a worm drive, a bracing shaft, and a free end brace;
   wherein the worm drive raises or lowers a windshield wiper above a windshield or back onto the windshield;
   wherein the worm drive attaches to the control apparatus in a manner of a cantilever;
   wherein the bracing shaft forms a brace that stabilizes the worm drive during an operation of the worm drive;
   wherein the free end brace maintains the bracing shaft in a fixed position relative to a drive bolt.

2. The accessory for the windshield wiper according to claim 1
   wherein the accessory for a windshield wiper further comprises a vehicle;
   wherein the vehicle further comprises the windshield and the windshield wiper;
   wherein the windshield wiper further comprises a claw and one or more blades;
   wherein the accessory for a windshield wiper attaches to the windshield wiper;
   wherein the accessory for a windshield wiper is an automatic device;

wherein the accessory for a windshield wiper is remotely controlled.

3. The accessory for the windshield wiper according to claim 2
wherein the control apparatus attaches the windshield wiper to the vehicle;
wherein the control apparatus is an electromechanical structure;
wherein the control apparatus: a) receives instructions remotely; b) provides the energy necessary to generate motive forces required to operate the lifting structure; and, c) controls the operation of the lifting structure.

4. The accessory for the windshield wiper according to claim 3
wherein the lifting structure is a mechanical structure;
wherein the lifting structure mechanically raises or lowers the windshield wiper above the windshield or back onto the windshield of the vehicle.

5. The accessory for the windshield wiper according to claim 4
wherein the control apparatus comprises a control housing and a control circuit;
wherein the control housing contains the control circuit.

6. The accessory for the windshield wiper according to claim 5
wherein the control housing is a rigid structure;
wherein the control circuit is an electric circuit;
wherein the control circuit receives instructions remotely over a wireless communication link.

7. The accessory for the windshield wiper according to claim 6
wherein the control circuit controls the operation of the lifting structure;
wherein the control circuit is an independently powered electric circuit.

8. The accessory for the windshield wiper according to claim 7
wherein the control circuit comprises a first electric motor, a remote control device and a wireless communication link;
wherein the first electric motor attaches to the lifting structure;
wherein the control circuit establishes the wireless communication link with the remote control module.

9. The accessory for the windshield wiper according to claim 8
wherein the worm drive is a mechanical structure;
wherein the worm drive is a rotating structure;
wherein the worm drive attaches to the control apparatus such that the control apparatus drives the operation of the worm drive.

10. The accessory for the windshield wiper according to claim 9
wherein the bracing shaft is a rigid structure;
wherein the bracing shaft attaches to the control apparatus such that the bracing shaft projects away from the control apparatus in the manner of the cantilever;
wherein the bracing shaft attaches to the control apparatus such that a center axis of the free end brace is parallel to the center axis of the drive bolt of the worm drive;
wherein the bracing shaft forms a brace that stabilizes the drive bolt during the operation of the worm drive.

11. The accessory for the windshield wiper according to claim 10
wherein the free end brace is a mechanical structure;
wherein the free end brace attaches to a free end of the cantilever structure formed by the drive bolt of the worm drive;
wherein the free end brace simultaneously attaches to the free end of the cantilever structure formed by the bracing shaft;
wherein the free end brace maintains the free end of the cantilever structure of the bracing shaft in a fixed position relative to the free end of the cantilever structure of the drive bolt.

12. The accessory for the windshield wiper according to claim 11
wherein the control circuit is a programmable electronic device;
wherein the control circuit establishes the wireless communication link between the control circuit and the remote control device.

13. The accessory for the windshield wiper according to claim 12
wherein the first electric motor is an electric motor;
wherein the control circuit controls an operation of the first electric motor;
wherein the first electric motor converts electrical energy into rotational energy;
wherein the first electric motor mechanically attaches to the worm drive such that the first electric motor drives the worm drive of the lifting structure.

14. The accessory for the windshield wiper according to claim 13
wherein the remote control device is an electric circuit;
wherein the remote control device forms the wireless communication link with the control circuit such that the remote control device can send operating instructions to the control circuit.

15. The accessory for the windshield wiper according to claim 14
wherein the worm drive comprises the drive bolt and a drive nut;
wherein a first electric motor drives the rotation of the drive bolt;
wherein the drive bolt is a bolt that is further formed with an exterior screw thread;
wherein a congruent end of the drive bolt to the first electric motor such that the rotation of the first electric motor rotates the drive bolt;
wherein the drive bolt attaches to the first electric motor in the manner of the cantilever;
wherein the axis of rotation of the first electric motor aligns with the center axis of the drive bolt;
wherein the drive nut is a device that screws onto the drive bolt to form a threaded connection;
wherein the rotation of the drive bolt moves the drive nut in a direction parallel to the center axis of the drive bolt;
wherein the windshield wiper attaches to the drive nut such that the motion of the drive nut along the drive bolt pushes the raises the windshield wiper above the windshield.

\* \* \* \* \*